(12) United States Patent
Spaulding

(10) Patent No.: US 7,975,392 B1
(45) Date of Patent: Jul. 12, 2011

(54) DOWNHOLE TOOL

(75) Inventor: Paul D. Spaulding, Gloucestershire (GB)

(73) Assignee: National Oilwell Varco, L.P., Houston, TX (US)

( * ) Notice: Subject to any disclaimer, the term of this patent is extended or adjusted under 35 U.S.C. 154(b) by 22 days.

(21) Appl. No.: 12/720,758

(22) Filed: Mar. 10, 2010

(51) Int. Cl.
*G01C 19/00* (2006.01)

(52) U.S. Cl. ............................. 33/302; 33/313

(58) Field of Classification Search .................. 33/302, 33/303, 313, 318, 321, 322, 323, 542, 544
See application file for complete search history.

(56) References Cited

U.S. PATENT DOCUMENTS

| | | | |
|---|---|---|---|
| 5,272,922 A * | 12/1993 | Watson | 33/318 |
| 5,332,048 A | 7/1994 | Underwood et al. | |
| 5,341,886 A | 8/1994 | Patton | |
| 6,092,610 A * | 7/2000 | Kosmala et al. | 175/27 |
| 6,918,186 B2 * | 7/2005 | Ash et al. | 33/313 |
| 7,093,370 B2 * | 8/2006 | Hansberry et al. | 33/313 |
| 7,117,605 B2 * | 10/2006 | Ekseth et al. | 33/304 |
| 7,363,717 B2 * | 4/2008 | Ekseth et al. | 33/304 |
| 7,413,032 B2 | 8/2008 | Krueger | |
| 2005/0126022 A1 * | 6/2005 | Hansberry et al. | 33/313 |
| 2009/0229882 A1 * | 9/2009 | Quernheim et al. | 175/26 |

* cited by examiner

*Primary Examiner* — Yaritza Guadalupe
(74) *Attorney, Agent, or Firm* — Conley Rose, P.C.

(57) ABSTRACT

Tools and methods for subsurface operations. Circuit arrangements providing a damping effect against undesired vibration effects on inertial data signals derived from inertial sensors disposed in a downhole tool.

22 Claims, 9 Drawing Sheets

DOWNHOLE TOOL

FIELD OF THE INVENTION

Embodiments of the present invention relate to tools for subsurface use, and more particularly to circuit designs for operation of downhole tools/instruments.

BACKGROUND

Directional drilling is the practice of drilling non-vertical wellbores for the purpose of recovering oil and/or gas and for the utility horizontal directional drilling (HDD) sector. This is achieved by control of the lowermost part of the drillstring, also known as a bottom hole assembly (BHA). Typically a BHA comprises (from the bottom up in a vertical drills string) a bit, a mud motor (incorporating a bend in a steerable system), stabilizers, drill collars, heavy-weight drillpipe, jarring devices ("jars") and crossovers for various threadforms. The BHA must provide force for the bit to break the rock (weight on bit), survive a hostile mechanical environment and provide the driller with directional control of the well. Often the BHA includes a mud motor, directional drilling and measuring equipment (directional tools'), measurements-while-drilling tools, logging-while-drilling tools and other specialized devices.

Typically, in order to drill a wellbore that deviates from vertical, a bend (positioned above or within the mud motor housing) places the longitudinal axis of bit away from the axis of the drillstring by between about 0.5° and 3.0°. This slight change in direction at the end of the drillstring is sufficient to enable the direction of drilling to be controlled by adjusting the weight on the bit and/or the angular position of the bend in the wellbore. A greater weight on bit causes a larger deviation from the present axis of the wellbore and vice-versa.

It is important to monitor the direction of drilling so that a desired target can be reached from the surface, perhaps following a predetermined path. To that end, the BHA comprises a directional tool whose function is to send data to the surface representing the present position of the bend so that, if needed, adjustments can be made by rotating the drillstring and/or controlling the weight on bit. The directional tool is often positioned behind the mud motor.

At present magnetic directional tools are used almost exclusively for open hole directional borehole drilling trajectory monitoring and control within the oilfield well construction and utility (e.g. river crossing) horizontal directional drilling sectors. The directional tool is normally installed along the axis of the BHA of the drillstring.

The directional tool comprises a number of sensors whose outputs may be analyzed to determine the orientation of the tool (and therefore of the bit). Often the sensors comprise an orthogonal triad of inertial grade accelerometers and a triad of orthogonal precision magnetometers, from which the attitude of the instrument body can be determined from instrument vector measurements of the earths gravitational and magnetic field respectively. The magnetometers and accelerometers are arranged within the directional tool so that one of each type is oriented on an X, Y and Z axis respectively. Usually the X and Y axes are mutually perpendicular and perpendicular to the longitudinal axis of the directional tool. Usually, the Z axis is perpendicular to both the X and Y axes and is parallel to the longitudinal axis of the directional tool. The instrument highside is the roll angle (usually resolved over 360 degrees) from a lateral instrument reference (usually measured from the gravity X or gravity Y axis) to a vertical plane above and along the Z axis of the instrument.

When the directional tool is installed into the BHA, there is generally some angular offset between the angle direction (perpendicular to the BHA axis) in which the bend points and a directional instrument highside angle. This angular offset is measured on-site before the BHA goes downhole. The offset is used to adjust the orientation reference provided by the directional tool so that the driller is informed about angular measurements of the BHA bend from the highside of the borehole. The indication of angular direction of the bend from the borehole highside is known as the 'gravity toolface' measurement. Often this direction is displayed to the driller on a circular dial on which the toolface is marked. In use, the output from each sensor is converted from analog to digital and samples are then averaged and processed with the outputs of the other sensors in order to provide a gravity toolface measurement.

Normally, borehole surveys are taken when the drillstring is stationary, following a completion of a 'kelly down' and prior to the addition of a stand or drillpipe length and recommencement of drilling activity. Under these conditions, the drillpipe is stationary and stable readings from the directional instrument can be readily obtained.

Drilling with a steerable (sliding) assembly, when power to drive the drill bit is obtained from a mud motor within the BHA, drilling directional control is effected by rotary positioning of the BHA via the drill rig rotary table or top drive. Such an arrangement permits both drilling and steering to take place simultaneously. However, since the BHA is subject to drilling induced vibrations (which are often random 3-axis vibrations comprising frequencies generally in the range 5-500 Hz), any gravity toolface measurements taken whilst drilling can be unstable or exhibit excessive swings in readings. This makes accurate tracking of wellbore direction more difficult and in some circumstances drilling still has to be stopped periodically to check wellbore direction.

Nevertheless some operators attempt to obtain 'surveys on the fly' whilst running a steerable assembly and rely on fast data acquisition and fairly sophisticated averaging techniques to obtain quantitative steering and survey data.

There are other rotary drilling and steering applications that rely on directional instruments, for example: survey acquisition and trajectory control, such as Inclination at the Bit, rotary assembly inclination and surveying, geosteering and Rotary Steerable Systems (RSS), the latter of which relies on roll stabilization of an inertial platform for active gravity toolface control or full (inclination and azimuth) trajectory control. In such applications, the sensors of the directional tool are also impaired by drilling induced vibration.

In all of the above applications, drilling induced vibrations can be of such severity that the sensor outputs saturate causing non-linearity, which cannot be processed by data acquisition and averaging techniques.

The oilfield well construction and utility industries use a range of commercially available servomechanism accelerometers for the measurement of the earth's gravitational field (G) and the industry standard for precision measurement is a flexible quartz hinge device. These are typically of a closed loop design whereby the current flowing in a correcting torquer coil is servoed to a proof mass position and the control attempts to maintain the proof mass in an equilibrium or null position. The magnitude of the torquer current is a measure of the G field vector acting on the accelerometer sensitive axis.

FIG. 1 shows part of a known circuit for processing the output from such an accelerometer A. Assuming that the accelerometer A is motionless, it outputs a steady current that is proportional to the acceleration along its sensitive axis. For drilling purposes in order to make the required directional readings of the tool, only the DC output from the accelerometer is of interest. The output current is converted into a measurable DC voltage via a precision resistor R1 and the voltage is subsequently measured by an analog-to-digital converter or ADC (not shown). During use, the temperature within the directional tool is also measured and is used to apply correction factors to the device and electronics. Three such accelerometers are installed in a directional instrument to measure the component of the gravitational field along each of the X, Y and Z axes of the tool as mentioned above. These accelerometers are calibrated and modelled following installation onto the instrument housing to ensure the magnitude and misalignment errors are minimised. Repeatable and predictable functioning of the accelerometers is therefore of critical importance to accurate modelling and measurement of G.

At present the drilling industry demands 0.1° accuracy in inclination measurements provided by each accelerometer. This level of accuracy means that a directional tool must be able to detect a change of 1 mG in the inclination of each accelerometer. Typical output currents from commercially available accelerometers are about 3.0 mA/G and this means that the circuitry that processes the output current must be able to resolve a change output current of the order to 3 µA.

The applicant has identified a particular problem in achieving this end. In particular, at present virtually all directional tools rely on ADC converters to sample the DC voltage generated by output current from the accelerometer through a precision resistor. Each ADC has a certain voltage capture range and a certain number of bits of resolution. A 12-bit resolution is common, although the problem is the same whatever the number of bits. In order to resolve at the required level, it is necessary to use at least one thousand quantisation levels for both positive and negative input voltages. Accordingly there is a minimum voltage input required to the ADC given by (1000/total number of quantisation levels) multiplied by the voltage capture range of the ADC.

For example, the MAX186 12-bit ADC is commonly used in directional tools. This has a capture range of ±2V and therefore the minimum input voltage from the circuit to achieve the desired resolution is ±0.98V~±1V.

When drilling is stopped to take a survey measurement, the DC voltage from the circuit is stable and lies within the capture range of the ADC.

However, under vibration conditions (such as those caused when drilling with a steerable assembly), the output from each accelerometer is changed by the addition of a non-periodic AC-like waveform on top of the DC component. This AC waveform is caused by the variable torquer coil current needed to hold the proof mass steady in the null position under the vibration. Nevertheless, extraction of the DC component of acceleration is still possible within the frequency bandwidth capability of the sensing system. However, the applicant has found that with existing circuits tolerance to vibration above a few G is very poor. What happens is that the DC output from the circuit quickly moves outside the capture range of the ADC causing clipping of the DC output voltage and a rectification error, leading to a gravity toolface measurement that can be several tens of degrees off.

FIGS. 2 and 3 show the response of a directional tool employing the circuit shown in FIG. 1. The tool was oriented on the test rig so that the Z axis was horizontal, and the X and Y axis accelerometers were plus and minus 45° from horizontal respectively. The directional tool was subjected to sinusoidal oscillations in the vertical plane at 25 Hz at 5 g constant peak acceleration. In FIG. 2, the y-axis shows the vector sum (Gtot) of the acceleration outputs from each of the three accelerometers, versus time on the x-axis. Before vibration was started, the correct reading of 1 Gtot was output from the tool. As soon as vibration began, the output is offset to 0.4 Gtot, which is caused by vibration rectification error. As explained above this error arises because the output voltage from the circuit is greater than the voltage capture range of the ADC into which the DC voltage is input. Accordingly, the voltage is clipped by the ADC; the proportion of the signal that is clipped on each of the positive and negative side of waveform determines the direction and magnitude of the rectification error. FIG. 3 shows error in the tool high side output which indicates that the axis has been rotated through about 10°, when in fact the tool has not been rotated at all. In use, this measurement would be combined with the aforementioned angular offset to provide the tool face measurement. This would be incorrect by 10° causing the driller to stop drilling and apply a rotational correction to the string when in fact none is needed.

The semi-sinusoidal part of the offset FIG. 2 is an aliasing effect of the sampling carried out by the ADC during the experiment. In particular, the sampling rate was only 120 samples for the whole experiment that lasted about three minutes. Therefore, the sampling rate does not meet the Nyquist criterion and aliasing of the input frequency can be expected. Nevertheless, this is not important as the experiment demonstrates the problems of rectification error. Normally in downhole measurements the output signal from an accelerometer is sampled at some hundreds of kilohertz and the vibration experienced from drilling is normally of the order of 5-500 Hz and so such aliasing is not experienced in practice.

An improvement to the circuit of FIG. 1 is shown in FIG. 4 and this latter circuit has been used in the field for some time. The circuit of FIG. 4 uses a low impedance path comprising R2 and C2 in parallel with the torquer coil current sensing resistor R1. This has the effect of shorting to ground a significant portion of the frequencies in the AC component of the output signal.

FIGS. 5 and 6 show the results of an experiment on a directional instrument employing the circuit in FIG. 4. The experiment was the same as that performed using the circuit of FIG. 1. As is clearly seen the outputs Gtot and high side exhibit reduced vibration rectification error and thereby improved performance when gravity toolface measurements are taken during drilling.

Despite the improved performance, there are several problems with a circuit of the type shown in FIG. 4 and other circuits employing a similar principle of operation. In particular, the capacitance C2 needs to be of significant magnitude if its cut-off frequency (3 dB point) is to be low enough to remove most of the AC component. Typical capacitances required are of the order of 100-300 µF. Such a capacitance is often provided by a wet tantalum capacitor, which is physically quite large, for example 15 mm diameter by 30 mm length. That problem is compounded by the fact that wet tantalum capacitors are polarised and therefore two such capacitors are required per accelerometer (to accommodate the bipolar signal from the accelerometer), and therefore six such capacitors are needed for all three accelerometers. This uses up a considerable portion of the space available within the directional tool for the circuit. There is industry pressure to make tools smaller. For example, some conventional directional tools have to fit within a cylindrical space of diameter between 25 mm and 36 mm and length 304 mm (12"). Therefore, it is desirable if space savings can be made where possible.

A further problem is that the directional tool must work reliably over long periods of time within a wide range of temperatures, for example from −5° C. up to about 175° C. At elevated temperatures it has been found that electrolytic capacitors suffer internal leaks, which causes current leakage that is non-linear with temperature. This is highly undesirable as such effects cannot readily be compensated during signal processing.

A small improvement in the vibration tolerance of the tool could be achieved by using a greater resolution ADC (e.g. a 16-bit) so that the required number of quantization levels (e.g. one thousand) occupy a lesser percentage of range. However, this does not stop the clipping of the DC voltage and rectification errors persist.

Accordingly, there is a need for improved tool and instrument designs that overcome the problems or reduce the errors discussed above.

SUMMARY

An embodiment of the invention provides a tool for use in a downhole operation. The tool includes at least one inertial sensor configured to provide inertial data signals during a downhole operation; wherein the inertial data signals are affected by undesired vibration; an electronic circuit configured to provide a damping effect against the undesired vibration effects on the inertial data signals; wherein the electronic circuit is configured to magnify a capacitance effect to compensate against the undesired vibration effects on the inertial data signals.

An embodiment of the invention provides a method of operating a downhole tool. The method includes obtaining inertial data signals during a downhole operation using at least one inertial sensor disposed on the downhole tool, wherein the inertial data signals are affected by undesired vibration; and providing a damping effect against the undesired vibration effects on the inertial data signals using an electronic circuit disposed on the downhole tool, the circuit configured to magnify a capacitance effect to compensate against the undesired vibration effects on the inertial data signals.

In some embodiments of the invention, a tool comprises at least one inertial sensor having a closed loop servomechanism for providing inertial data usable in constructing a borehole as part of a drilling operation, and which inertial sensor is liable to unwanted downhole induced vibration associated with borehole construction, the arrangement being such that, in use, unwanted vibration is superimposed as a waveform on an output current from the inertial sensor, the tool comprising a damping circuit having a capacitance for filtering at least some of the waveform from the output current, characterised in that the damping circuit comprises a sink for the waveform part of the output current to increase the filtering effect provided by the damping circuit. Unwanted downhole induced vibration includes drilling induced vibration, but also includes any other vibration downhole that affects the output current of the inertial sensor. In some embodiments the sink acts as both a positive and negative current sink, that is the sink acts on both positive and negative parts of the waveform. The inertial data may be useful in, but not limited to, any one or any combination of the following drilling operations: borehole trajectory guidance, geo-steering, rotary-steerable drilling, RPM data, gamma ray binning data, and drill string stick/slip measurements, and vertical borehole drilling. As such, the inertial data provided by the inertial sensor may, for example, represent acceleration along a sensitive axis of the sensor. One type of sensor useful for this purpose is an accelerometer.

One particular advantage of certain embodiments is that the at least one inertial sensor may be placed closer to a source of downhole vibration (e.g. the drill bit) whilst still providing accurate readings. This is a significant advantage since toolface measurements can be obtained that are nearer to the true toolface, enabling drilling trajectory to be controlled more accurately.

In some embodiments, at least a part of the feedback of the closed loop servomechanism is made available externally of the inertial sensor for manipulation and processing by the damping circuit. In other embodiments, the damping circuit is part of the inertial sensor and no part of the feedback is available externally of the housing of the inertial sensor. In certain embodiments, the sink comprises a path to ground for the waveform separate from another path to ground provided by the capacitance.

In some embodiments, the sink comprises solid-state circuitry for increasing the effective capacitance in the damping circuit. The solid-state circuitry may comprise a plurality of discrete transistors arranged to function as set out herein. Alternatively, the solid-state circuitry may comprise an op-amp.

In certain embodiments a sink comprises a negative feedback op-amp and a shunt resistance for bypassing a portion of the output current past the capacitance to the output of the op-amp, the arrangement being such that, in use, the op-amp sources and sinks current on behalf of the capacitance, thereby increasing the effective capacitance in the damping circuit.

The damping circuit may be configured to input the output current from the inertial sensor through a low pass filter comprising the capacitance and into a non-inverting input of the op-amp.

In some embodiments, a current buffer is provided on the output of the op-amp. One particular advantage of this is that the current output of the op-amp can be improved. In particular, for certain applications of the invention at high temperatures (e.g. above about 150° C.) the type of op-amp needed (e.g. low power, high precision, low offset, low bandwidth) is not able to source or sink more than a few milli-amps of current. A current buffer increases the amount of current that such an op-amp can source and sink to handle the waveform output from the inertial sensor. A further advantage is that the heat dissipation of source and sinking this current is spread over multiple components rather than one, which is important for downhole use at high temperature. In some embodiments, the sink comprises a capacitance multiplier.

In certain embodiments the damping circuit has a cut-off frequency of less than about 100 Hz, whereby deliberate changes in orientation of the inertial sensor are permitted to change the voltage stored across the capacitance and thereby the output indication of orientation provided by the damping circuit, but wherein higher frequencies in the output current leave the voltage across the capacitance substantially unaffected. How much of the waveform is left in the output current may be chosen for the particular application since some applications require much more of a waveform filtering affect than others. Accordingly, the cut-off frequency can be set according to the intended application, although in some embodiments the cut-off frequency can be adjusted during use. For example, a typical cut-off frequency would be about 10 Hz for rotary-steerable drilling, although higher and lower cut-off frequencies could be chosen. The cut-off frequency might be between about 30-50 Hz for rotary sensing applications e.g.

gamma ray sensing, RMP, stick/slip, etc. The deliberate changes in orientation of the inertial sensor may be caused for example by rotary drilling and by rotation of the drill string to change the toolface.

In some embodiments the damping circuit uses the output current from the inertial sensor to provide a DC output voltage representing a relative rotational position of the inertial sensor for use in guiding a drilling operation, the damping circuit being arranged to input the DC output voltage into an ADC that has an acceptable input voltage capture range above or below which an input voltage is clipped causing a rectification error in an output from the ADC, the arrangement being such that, in use, the DC output voltage is substantially stabilised by the damping circuit so that during drilling the DC output voltage remains substantially within the capture range of the ADC despite drilling induced vibration of the inertial sensor. In some embodiments, the damping or filtering effect provided by the damping circuit may be adjusted during use to try to maintain the DC output voltage within the capture range of the ADC in the tool.

In certain embodiments the tool comprises three mutually orthogonal inertial sensors, each (individually or collectively) having an associated damping circuit for filtering downhole induced vibration that appears as a waveform on the output current from the respective inertial sensor. In some embodiments, the damping circuit is adjustable to vary the filtering effect provided thereby. This adjustability may be carried out at the earths surface on site and just prior to use for example.

In other embodiments, the damping circuit is adjustable downhole whilst in use. This enables the tool to be controlled and used for different tasks if desired, for example switching between a toolface measurement tool to an RPM or stick/slip measurement tool.

To effect adjustability, in some embodiments of the invention, the damping circuit comprises a variable circuit element. Such a variable circuit element may be a digital potentiometer or an analog switch for example. Variation of the circuit element may adjust a cut-off frequency of the damping circuit.

In some embodiments, the tool may be suitable for use downhole where temperatures are in excess of about 150° C., and possibly in excess of about 175° C. The tool may be made suitable for use at even higher temperatures (e.g. 200° C.) with the use of suitable conventional circuit components, e.g. ceramic packaged and silicon on sapphire solid-state components.

According to another embodiment of the present invention there is provided for use in a tool that is used downhole in a drilling operation, which tool requires inertial references, a downhole instrument comprising a housing, at least one inertial sensor mounted in the housing, and a damping circuit having the damping circuit features set out herein.

According to another embodiment of the present invention there is provided a bottom hole assembly comprising a tool as set out herein. The tool may be part of a drill collar (centred or offset), may be provided as a sonde-based directional tool, or the tool may be positioned close to the bit for example within about 300 mm.

In some embodiments of the invention, a damping circuit is provided as an integral part of the inertial sensor. In other words, the damping circuit is not external to and separate from the inertial sensor. Accordingly, embodiments of the invention also provide an inertial sensor having a closed loop servomechanism, the arrangement being such that, in use, the inertial sensor provides an output current on which is imposed a signal representing vibration of the inertial sensor, the inertial sensor comprising a damping circuit having a capacitance for filtering at least some of the waveform from the output current, characterised in that the damping circuit comprises a sink for the waveform part of the output current to increase the filtering effect provided by the damping circuit. Such an inertial sensor may comprise any of the damping circuit features described herein. Furthermore such an inertial sensor may be used any of the embodiments described and contemplated herein.

In various embodiments of the present invention there is provided a method of steering a borehole, which method comprises the steps of:

drilling a borehole in the earth's surface with a drill string, at the lower end of which is a bottom hole assembly comprising a drilling mechanism such as a drill bit, air hammer or jet drill, etc.;

whilst drilling, taking downhole orientation-related measurements using a tool that is part of said bottom hole assembly;

during step (ii) receiving an output current from an inertial sensor that is part of said tool, but which is liable to unwanted drilling induced vibration superimposed as a waveform on the output current, and with a damping circuit having a capacitance filtering at least some of the waveform from the output current, comprising the step of increasing the filtering effect provided by the damping circuit by providing a sink for the waveform part of the output current. The orientation-related measurements may provide or can be used to provide: an orientation relative to a reference position; RPM data; gamma ray binning data; and drill string stick/slip measurements. The drilling method may be useful in, but not limited to, construction of wellbores (vertical and horizontal) for recovery of oil/gas/water, in laying of underground pipelines (e.g. when crossing rivers or other geographic obstructions), and in drilling of boreholes for geothermal purposes. Within the oil and gas field, the drilling method may be useful for rotary-steerable drilling and geo-steering amongst others.

BRIEF DESCRIPTION OF THE DRAWINGS

For a better understanding of the present invention reference will now be made, by way of example only, to the accompanying drawings, in which.

DETAILED DESCRIPTION

Figure 7:
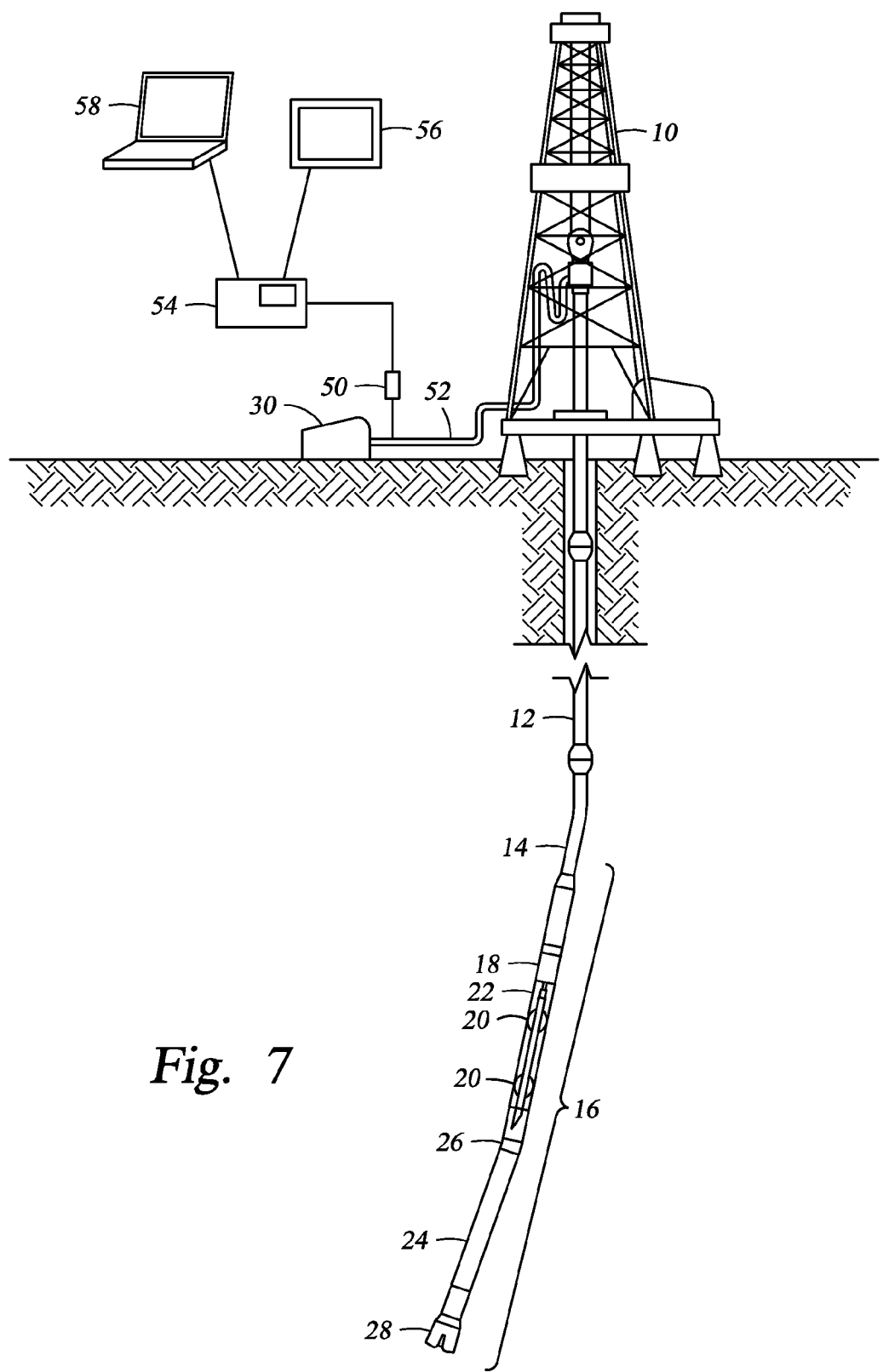
FIG. 7 is a schematic illustration of a directional tool in accordance with the present invention in use.

Referring to FIG. 7 a drilling rig 10 controls a drilling operation using a drillstring 12 that comprises lengths of drill pipe 14 screwed together end to end. The drilling rig 10 may be any sort of oilfield, utility, mining or geothermal drilling rig, including: floating and land rigs, mobile and slant rigs, submersible, semi-submersible, platform, jack-up and drill ship. A bottom hole assembly (BHA) 16 is positioned at the lower end of the drillstring 12. A typical BHA 16 comprises a MWD transmitter 18 (which may be for example a wireline telemetry system, a mud pulse telemetry system, an electromagnetic telemetry system, an acoustic telemetry system, or a wired pipe telemetry system), centralisers 20, a directional tool 22 (which can be sonde or collar mounted), a mud motor 24, a bend 26, stabilisers (fixed or variable) and a drilling mechanism 28, which may be electrically driven or more generally powered by drilling fluid such as compressed air, water, foam or mud.

A pump 30 is located at the surface and, in use, pumps drilling fluid through the drillstring 12 to power the mud motor 24, which twists the drill bit 28 to effect drilling when weight is placed on the drill bit under control of a driller and/or drilling control devices (not shown) at the surface. Drilling fluid leaves the drill bit 28 and serves to cool and lubricate the bit during drilling, and to return cuttings to the surface in the annulus formed between the drillstring and the wellbore (not shown).

Figure 8:
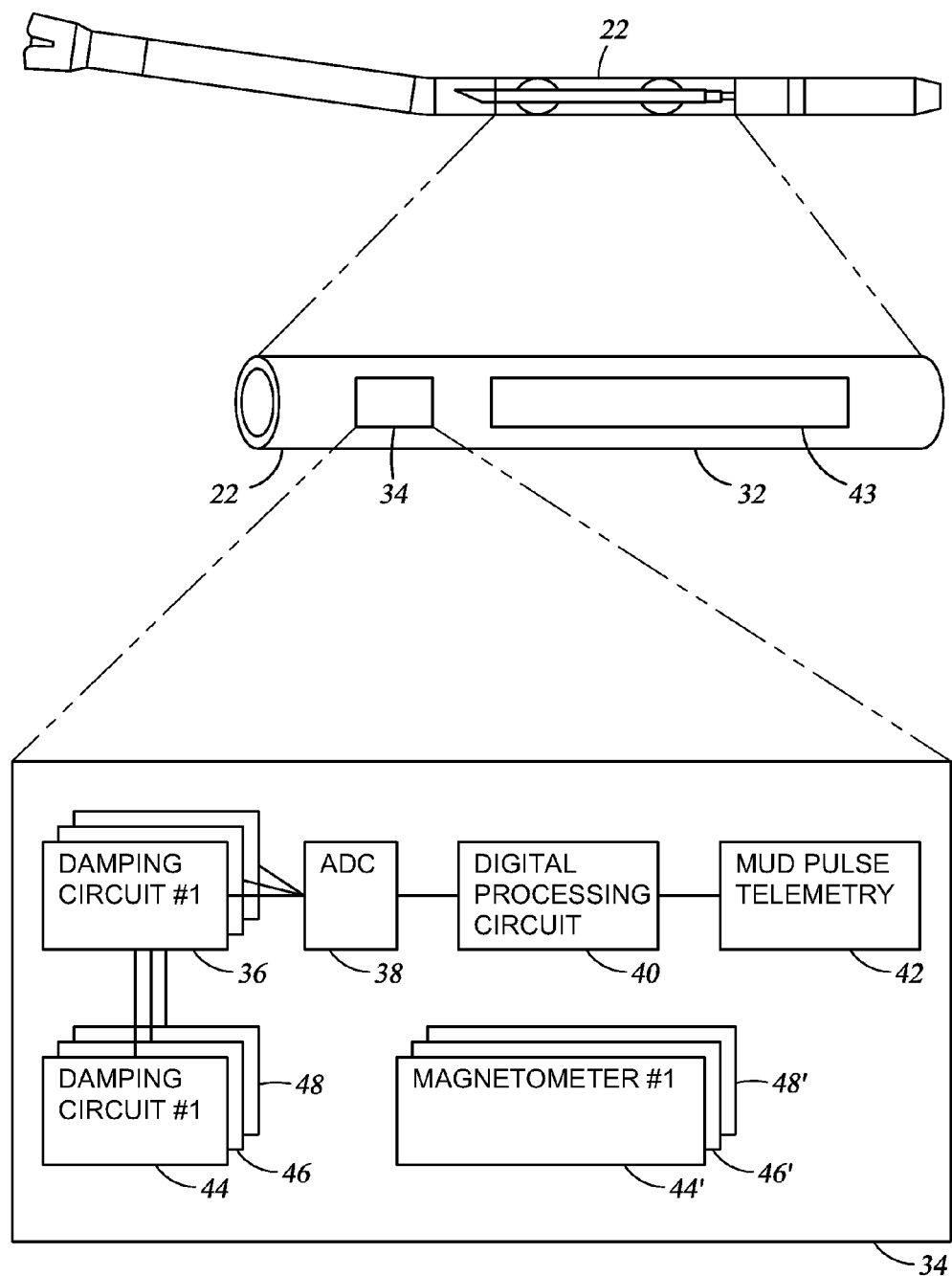
FIG. 8 is a schematic block diagram of a directional instrument according to the present invention.

Referring to FIG. 8 the directional tool 22 comprises a cylindrical housing 32 in the form of a sonde. The housing 32 comprise a tubular, which can be formed of non-magnetic material (such as stainless steel, beryllium copper or austenitic stainless steel), non-metallic composites, or other suitable compositions as known in the art. In some embodiments, a conventional battery pack 43 and a directional instrument 34 are mounted within the housing 32. Alternatively, a drilling fluid powered generator and regulator may be used to power the instrumentation as known in the art. Various components are mounted within the directional instrument 34: three damping circuits 36, an ADC 38, a signal processing circuit 40, a MWD telemetry unit 42, three inertial sensors 44, 46 and 48, and three magnetometers 44', 46' and 48', and a battery pack 43. As shown schematically there are three damping circuits 36, one for each of three inertial sensors 44, 46 and 48.

The following description is given for a drilling fluid pulse telemetry system, but is applicable to any of the alternative telemetry mechanisms cited herein and as known in the art. Data representing measurements taken by the directional tool 22 is conveyed to the surface using pulses which are pulses of pressure transmitted through the drilling fluid in the interior of the drillstring 12. The pulses are generated by the mud pulser 18 (comprising a pressure pulse transmitter) under control of the mud pulse telemetry unit 42. Referring again to FIG. 7 a standpipe pressure transducer 50 senses the pressure in a line 52 that conveys drilling fluid from the pump 30 to the drillstring 12. The standpipe pressure transducer 50 sends signals representative of that pressure to a decoding interface box 54 which comprises a PLC containing software for decoding the signal and outputting the measurements taken by the directional tool 22 to a display, in this example comprising a driller's display 56 and a laptop 58.

By using the measurement of gravity toolface provided by the directional tool 22, a driller at the surface is able to control the trajectory of the wellbore. Alternatively, the output from the decoding box could be input to another PLC that uses the measurement of gravity toolface to automatically or semi-automatically control the trajectory.

It is important to have an indication of gravity toolface which gives the desired accuracy, typically ±1°. As previously explained, prior circuits that process the output from an inertial sensor do not provide that indication, and/or give rise to other problems such as reliability, repeatability and make increased demands on space within the tool.

Figure 9:
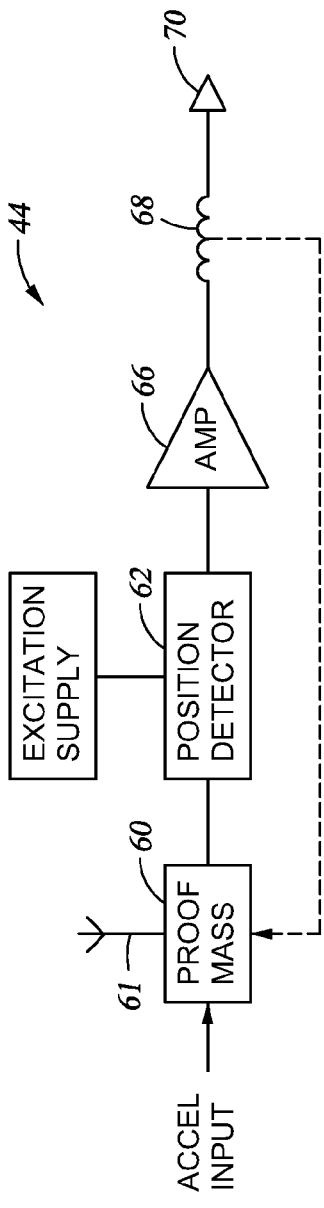
FIG. 9 is a schematic block diagram of an accelerometer employed by the present invention.

FIG. 9 shows a block diagram of one of the inertial sensors 44 (each of the inertial sensors 46, 48 is the same). In this embodiment, the inertial sensor 44 comprises a conventional accelerometer. The accelerometer 44 comprises a proof mass 60 (i.e. a mass known to high precision) that is hinged via a flexile quartz hinge 61 to the body of the accelerometer. A position detector 62 (typically a capacitive position detector) detects the position of proof mass 60 relative to an end stop, one at either side of the mass. An excitation supply 64 provides power to the position detector 62 whose output is amplified by an amplifier 66 to drive current through a torquer coil 68 that keeps the proof mass 60 in its equilibrium position. The current output from the torquer coil 68 reaches an output pin 70. This current is converted to a voltage via an external resistor as described in greater detail below. In use, the accelerometer 44 provides enough current to the torquer coil 68 to maintain the proof mass 60 in capture. However, in some embodiments, the accelerometer is driven by a low voltage power supply (e.g. ±12V) and there is typically a limit to how much current can be supplied. If vibration on the sensitive axis of the accelerometer reaches a sufficient magnitude, the current output saturates and the proof mass is no longer held in capture. Any other conventional inertial sensor could be used in place of the accelerometer 44, preferably an inertial sensor comprising a closed loop feedback servomechanism. In some embodiments, at least a part of the feedback of the servomechanism is available externally of the inertial sensor for manipulation and processing by an external circuit such as the damping circuit 36. In other embodiments, an external circuit, such as the damping circuit 36, could be integrated with the inertial sensor such that the feedback loop is or is not accessible externally.

Figure 10:
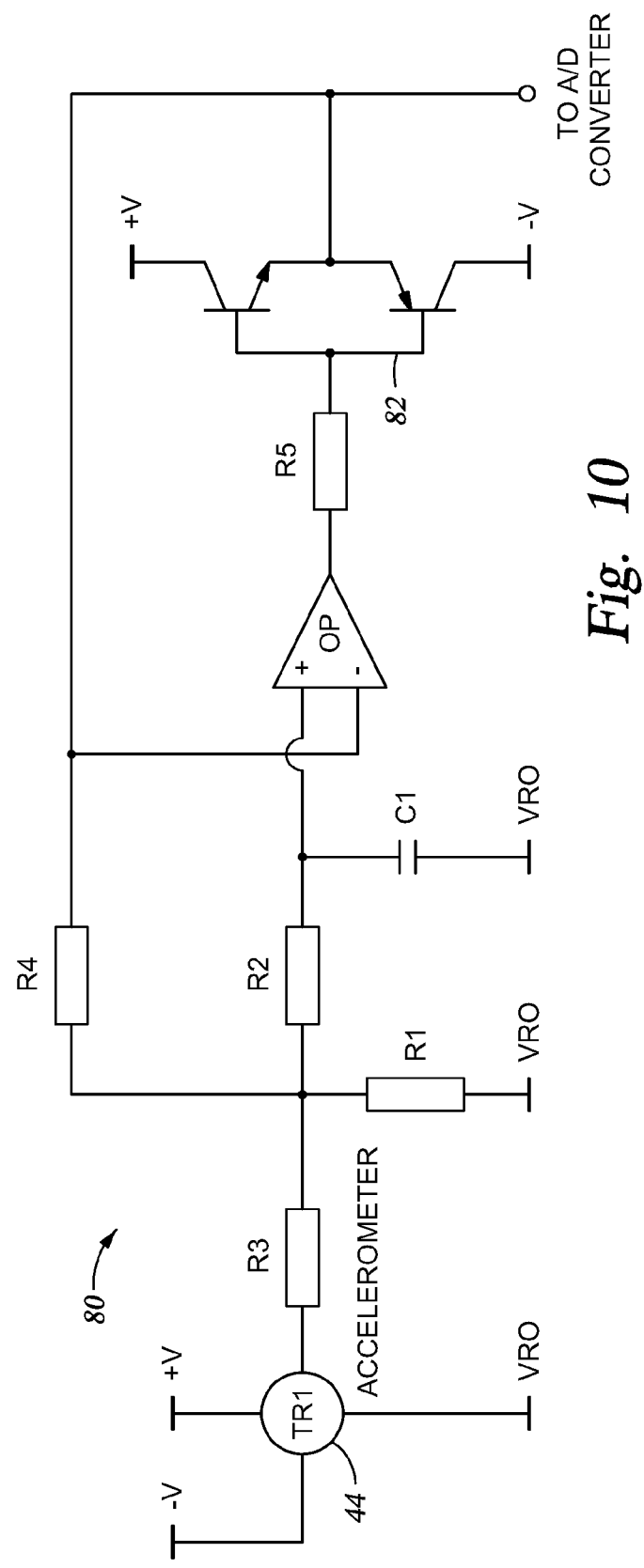
FIG. 10 is a schematic block diagram of an embodiment of a damping circuit according to the present invention.

FIG. 10 shows a block diagram of a damping circuit 80 embodiment of the invention. The circuit 80 is shown connected to an accelerometer 44. Resistor R3 provides protection for the circuit 80 by limiting the magnitude of the current from the accelerometer 44. Resistor R1 converts the current output from the accelerometer to a voltage. In this embodiment, the accelerometer output is 3.0 mA/G±5% and at 1 G (no vibration) a DC voltage of ±1.24V is dropped across R1. The DC voltage varies between the two values depending on the rotational position the sensitive axis of the accelerometer 44 in the wellbore. A low pass filter is connected across R1 and is formed by the combination of a resistor R2 and a capacitor C1. The voltage across C1 is input to an op-amp OP that is arranged in a unity gain configuration. It will be appreciated by those skilled in the art that the embodiments of the invention disclosed herein can be implemented using any suitable commercially available electronics components and hardware.

The current output from the op-amp OP is limited by a resistor R5 and is input to a current buffer amplifier 82 that acts as a current follower with a gain. The current buffer amplifier comprises a complementary pair of transistors to handle the bipolar current from the accelerometer 44. The maximum switching frequency of the op-amp OP between positive and negative current is preferably lower than the maximum frequency that the transistors in the buffer amplifier can switch on and off.

The resistor R5 and the current buffer 82 are useful for certain high vibration scenarios, however, these components are optional as in some circumstances protection against such large vibration may not be needed.

A shunt resistor R4 is connected between the junction of resistors R1, R2 and R3 and the negative feedback of the op-amp OP. All of the active components in the circuit, i.e. accelerometer 44, op-amp OP and current buffer amplifier 82 may be powered by the same power supply (e.g. battery pack 43).

In use, assuming no vibration of the directional tool 22 that lies in the sensitive axis of the accelerometer 44, the capacitor C1 will be quickly charged by the current from the accelerometer and the voltage at the non-inverting input of the op-amp OP will sit at the DC voltage across the charged capacitor. Via the negative feedback the op-amp OP maintains the voltage on the non-inverting input almost exactly identical, so that no current flows in the circuit.

Assuming now that the directional tool 22 suffers some drilling induced vibration, the output current from the accelerometer 44 has a periodic/non-periodic ac-like waveform superimposed upon it. However, the low pass filter shorts to ground such ac frequency components in the output current since the capacitor C1 tries to resist any change to the voltage across it by sourcing or sinking current; as is well-known the reactance of a capacitor increases with frequency and therefore the higher frequency components are shorted to ground more easily. The notional cut-off frequency $f_c$ of the low pass filter is in the low hundred Hz range. However, the presence of the shunt resistor R4 allows the op-amp OP to source and sink current on behalf of the capacitor C1, effectively increasing the capacitance of C1 and lowering the cut-off frequency $f_c$ of the low pass filter. In particular, for frequencies of several Hz upwards the voltage drops across R2 and R4 are approximately the same and therefore there is a relatively much larger current passed through resistor R4 than through the resistor R2. The current through the resistor R4 is larger by a factor R2/R4. This larger current is either sourced or sunk by the op-amp OP (depending on the polarity of the output current from the accelerometer at the time), which tries to maintain the voltage on the inverting input the same as that on the non-inverting input. Since the voltage on the non-inverting input only varies in response to a change in orientation of the tool, the op-amp OP maintains the voltage at its output close to the DC level, but sources and sinks higher frequency current to/from ground. Therefore, the circuit makes the capacitance of C1 appear as though it is R2/R4 times larger. This lowers the cut-off frequency $f_c$ without having to make the capacitor C1 physically larger.

In contrast, slow changes to the voltage across resistor R1 do affect the DC voltage stored across the capacitor C1. In this way, the voltage at the non-inverting input of the op-amp can change slowly over a range to show how the sensitive axis of the accelerometer 44 has moved relative to the gravity vector.

By using solid state electronics to magnify the capacitive effects of a small ceramic capacitor C1 to effectively simulate a large damping capacitor on the accelerometer output, this provides the torquer current with an ac path that allows the accelerometer to hold proof mass capture at a much higher vibration frequencies and maintains the DC output of the damping circuit with the capture range of ADC. Furthermore, the active circuit design is highly repeatable, and consequently associated thermal offsets and drifts can readily be modelled and compensated, thereby maintaining DC component accuracy over the operating temperature range.

In the field, drillers would like to know to the nearest 0.1° the inclination of each axis X, Y and Z. Each rotation of 0.1° about any one axis corresponds to a change in G of about ±1 mG. In one embodiment, the ADC 38 has an input range of ±2V and a resolution of 12 bits, corresponding to 2048 sample levels between 0V and 2V. Therefore to resolve 1 mG over a range of 0 to 1 G at least 1000 of those sample levels are needed, corresponding to an minimum input voltage to the ADC at 1 G of 0.97 mV×1000=0.97V ~1V. Input voltages much higher than this are caused by vibration, and once the peak input voltage rises above 2V the ADC 38 loses capture and a rectification error is caused (see FIG. 2). When the vibration is of very high peak G, the rectification error can cause an error in the gravity toolface measurement of some tens of degrees or more, perhaps as much as 80° or 90°. This is extremely problematic for the driller, who is likely to adjust the drilling trajectory to compensate when in fact no compensation is needed. It will be appreciated that use of higher resolution ADC (e.g. 16 bit) would permit the input voltage to be reduced to provide the same 1 mG accuracy.

The DC voltage output from the op-amp OP is input into the ADC 38. Due to the frequency damping properties of the circuit 80, there is much less chance that the ADC will lose capture of the signal causing a rectification error. This means that the driller can have much more confidence in the gravity toolface measurement whilst drilling. Because of the increase stability in the DC voltage output from the circuit 80, it would be possible to increase the value of the precision resistor R1 to output a larger DC voltage since ADC clipping due to vibration is less likely. This is a significant advantage as the accuracy of the gravity toolface measurement is improved.

Embodiments of the invention can be implemented using conventional ADCs. In use, the ADC is programmed to repeatedly sample (e.g. at several hundred kHz) each of the three damping circuits in turn over a set period and to output the samples for each channel to the digital processing circuit 40. This circuit arithmetically averages the samples for each channel to obtain an average inclination. The three values are then used to determine their vector sum to check that they add to 1 G. The gravity toolface measurement is then determined using the average inclination values for each axis and the readings from the magnetometers. The gravity toolface measurement is then transmitted to the surface using the mud pulse telemetry unit 42 and the mud pulser 18. The process is then repeated after a set time period to provide the driller with the next gravity toolface measurement.

Figure 1:
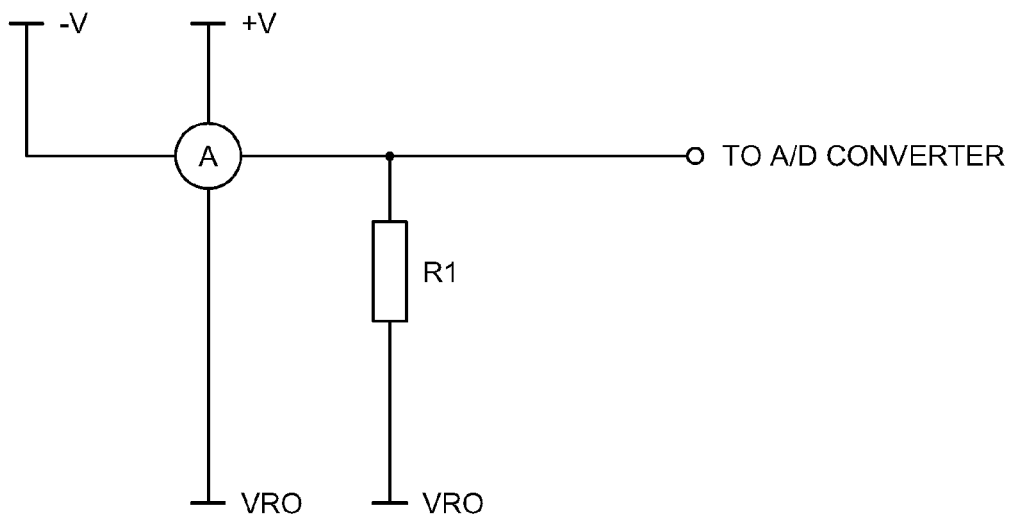
FIG. 1 is a schematic diagram of part of a first known signal processing circuit for use with an accelerometer in a directional tool.
Figure 2:
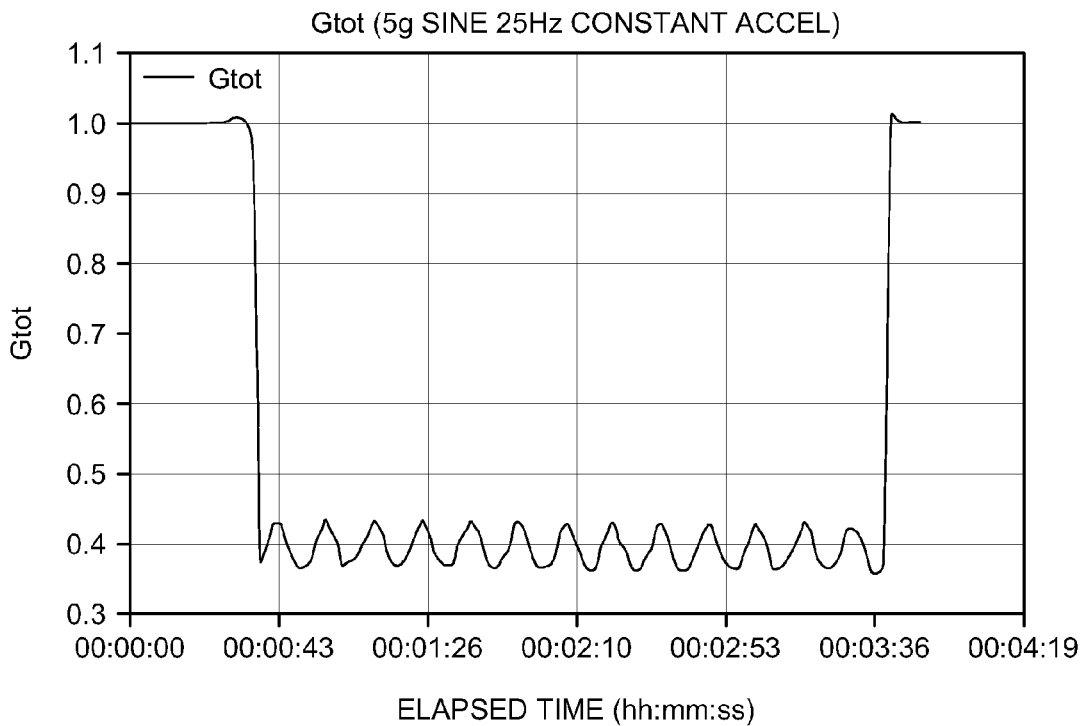
FIG. 2 is a graph of Gtot versus time for a vibration experiment using the circuit of FIG. 1.
Figure 3:
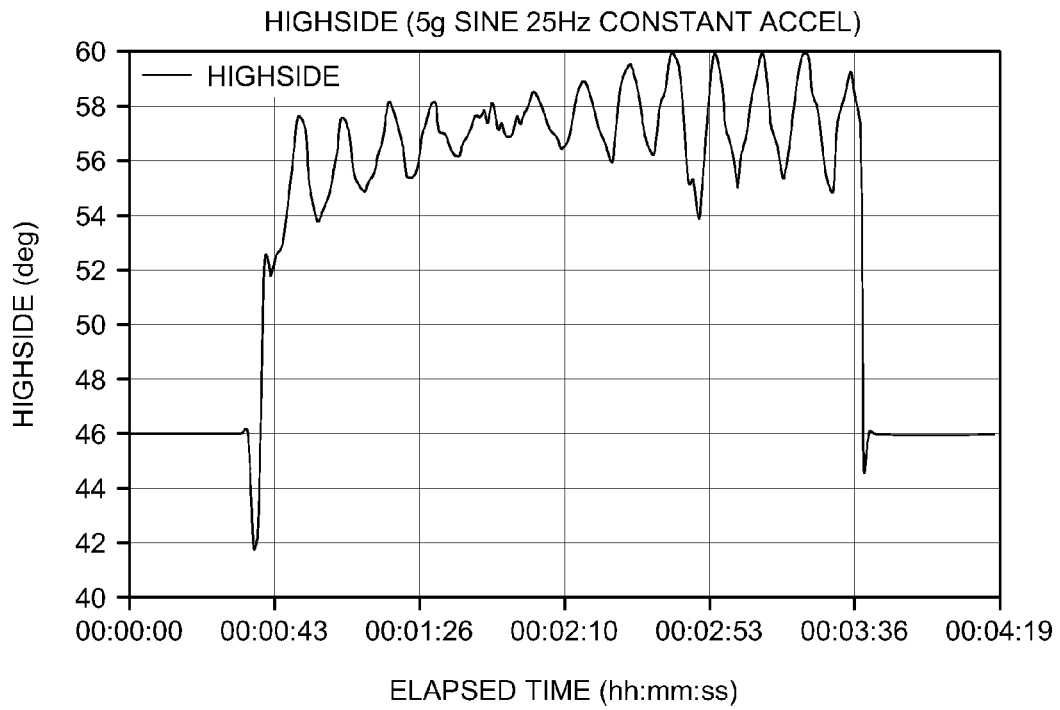
FIG. 3 is a graph of tool high side versus time in the vibration experiment of FIG. 1.
Figure 4:
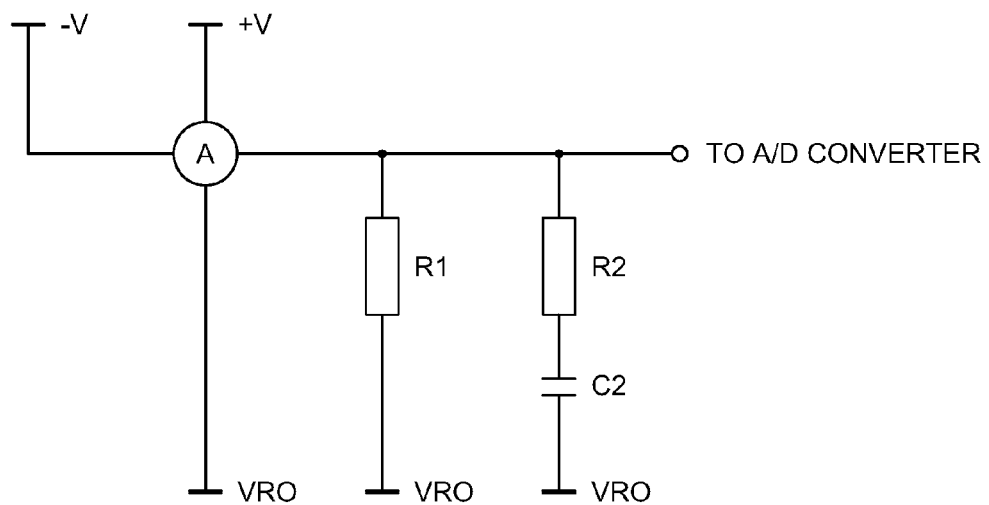
FIG. 4 is a schematic diagram of part of a second known signal processing circuit for use with an accelerometer in a directional tool.
Figure 5:
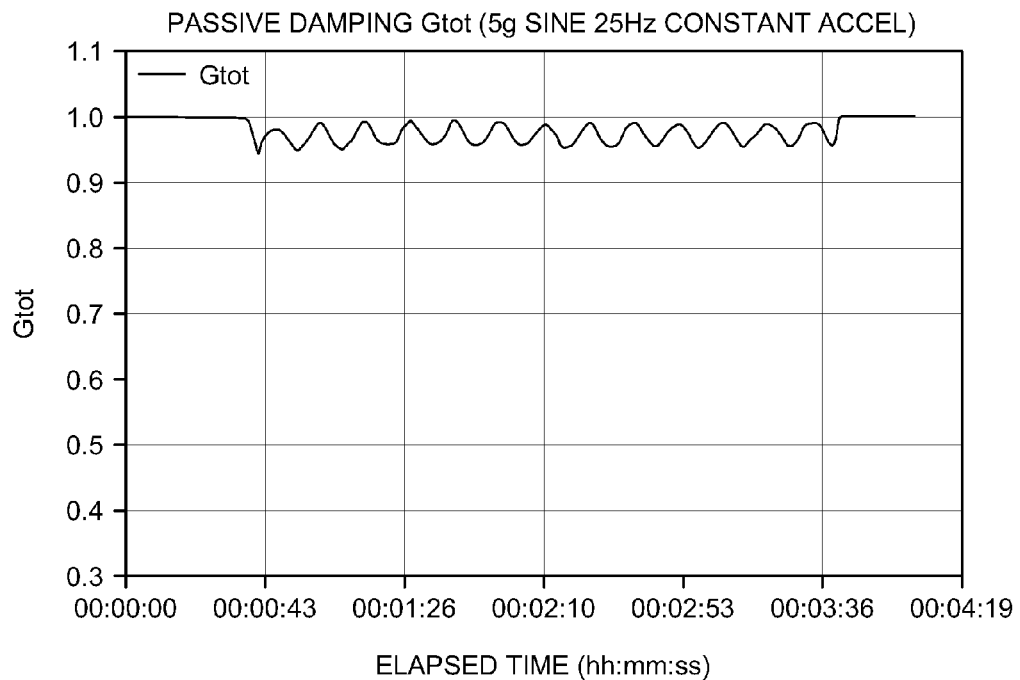
FIG. 5 is a graph of Gtot versus time for a vibration experiment using the circuit of FIG. 4.
Figure 6:
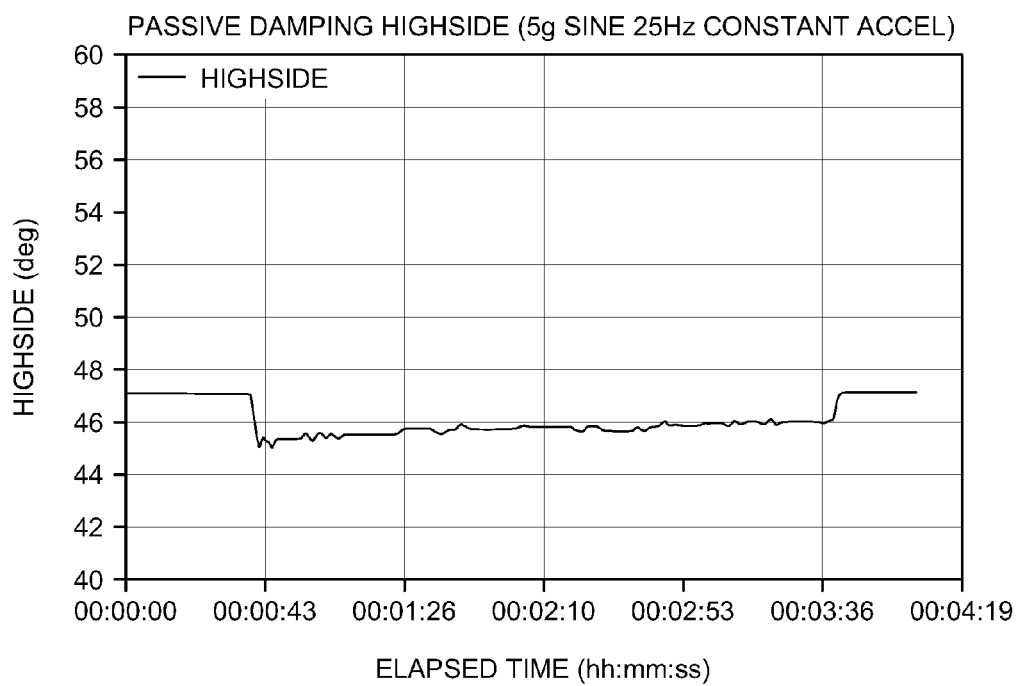
FIG. 6 is a graph of tool high side versus time in the vibration experiment of FIG. 4.
Figure 11:
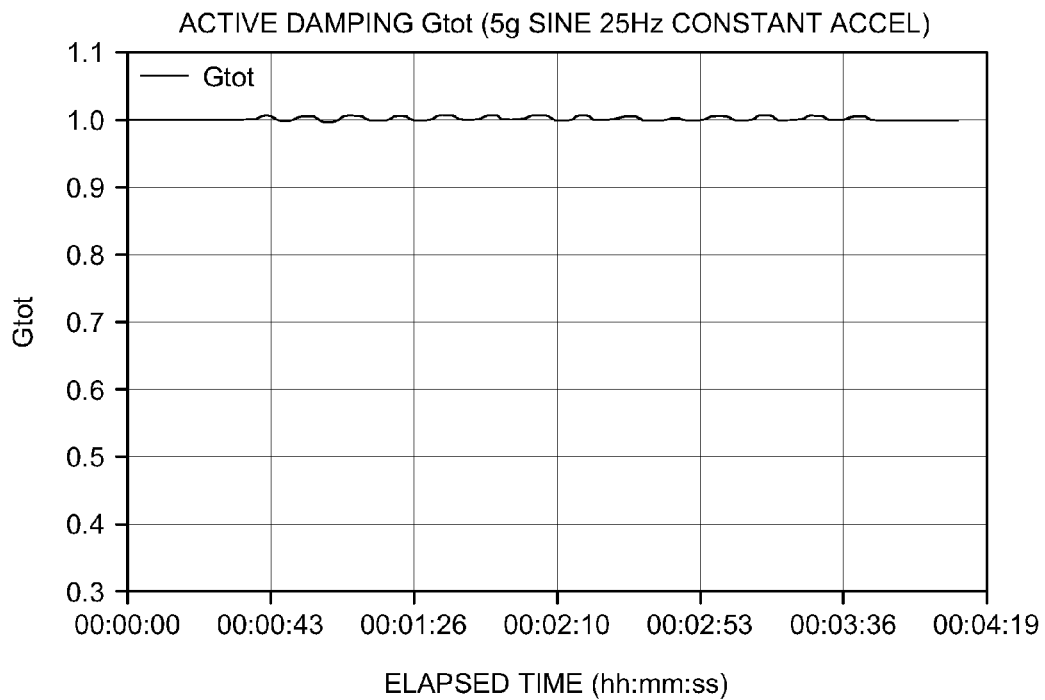
FIG. 11 is a graph of Gtot versus time for a vibration experiment using the circuit of FIG. 10.
Figure 12:
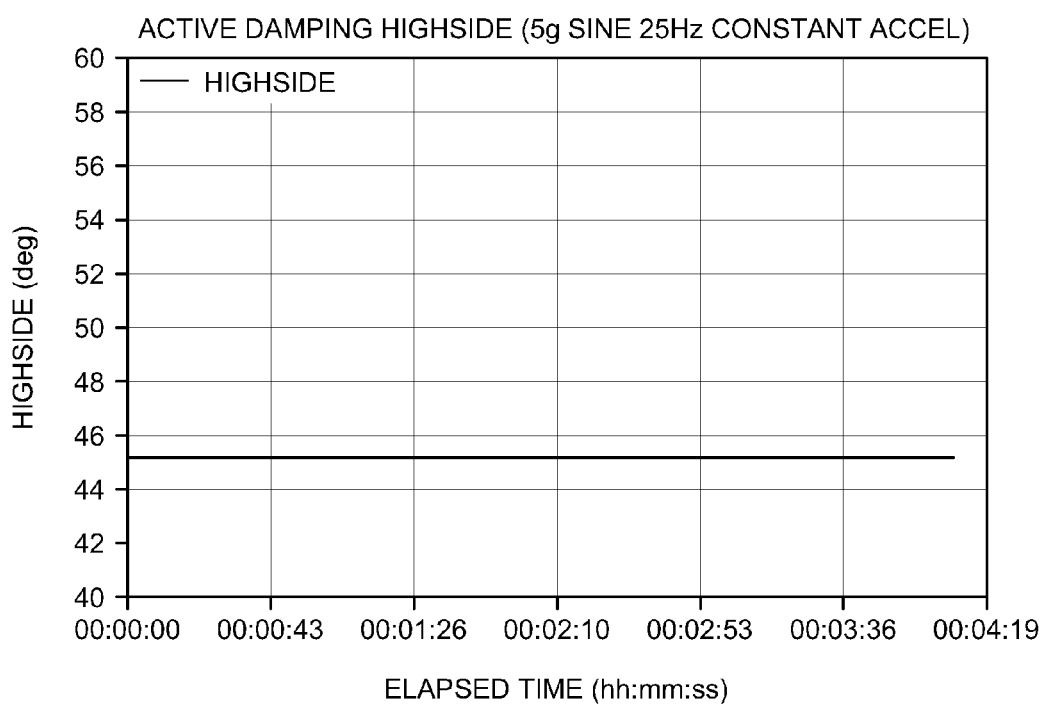
FIG. 12 is a graph of tool high side versus time in the vibration experiment of FIG. 10.

FIGS. 11 and 12 show the results of an experiment, similar to that explained in relation to FIGS. 2 and 3, that was performed on the directional tool 22 comprising the circuit 80. Vibration of the tool was started after about 40 s. As is clearly seen in FIG. 11 there is little or no rectification offset error in the Gtot output. In FIG. 12 there is also no error in the high side reading of the directional tool 22. The circuitry output voltage has been measured and been shown to be very stable up to 16 G vibration and usable to 20 G vibration using suitable averaging techniques; this has been demonstrated up to 175° C., but is possible at higher temperatures with selection of suitable higher temperature capable electronic components. One such suitable averaging technique comprises reading the output of each accelerometer 44, 46, 48 in turn (followed by the output of each magnetometer) at the sampling frequency available on the ADC, storing the results in memory, repeating that sequence of readings, and taking an arithmetic average of the output values from each accelerometer. These average values are then vector combined to give a reading of Gtot.

The functionality of the damping circuit may be used with other downhole tools, for example gamma surveying instruments. The improved gravity toolface measurement enables the driller to know with more certainty where a particular binning window of the gamma detector crystal is centred, since this measurement is also based on gravity toolface.

The functionality of damping circuit embodiments according to the invention can be further improved by making the damping effect of the circuit variable. Such variability may be provided by microprocessor control so that the damping provided may be adjusted downhole during use. Such variability greatly increases the functionality of a single tool, enabling it to perform functions that require different damping effects on the output signal of the inertial sensor: for example a function that requires a very low cut-off frequency (e.g. measurement of inclination for a gravity toolface measurement, typically requiring ±0.1° accuracy) and a function that requires a higher cut-off frequency (e.g. measurement of RPM whilst drilling and/or stick/slip of the drill string). By adjustment of the damping effect, the circuit can be adapted for the particular function required. Two exemplary embodiments of variable damping effect are described below.

Figure 13:
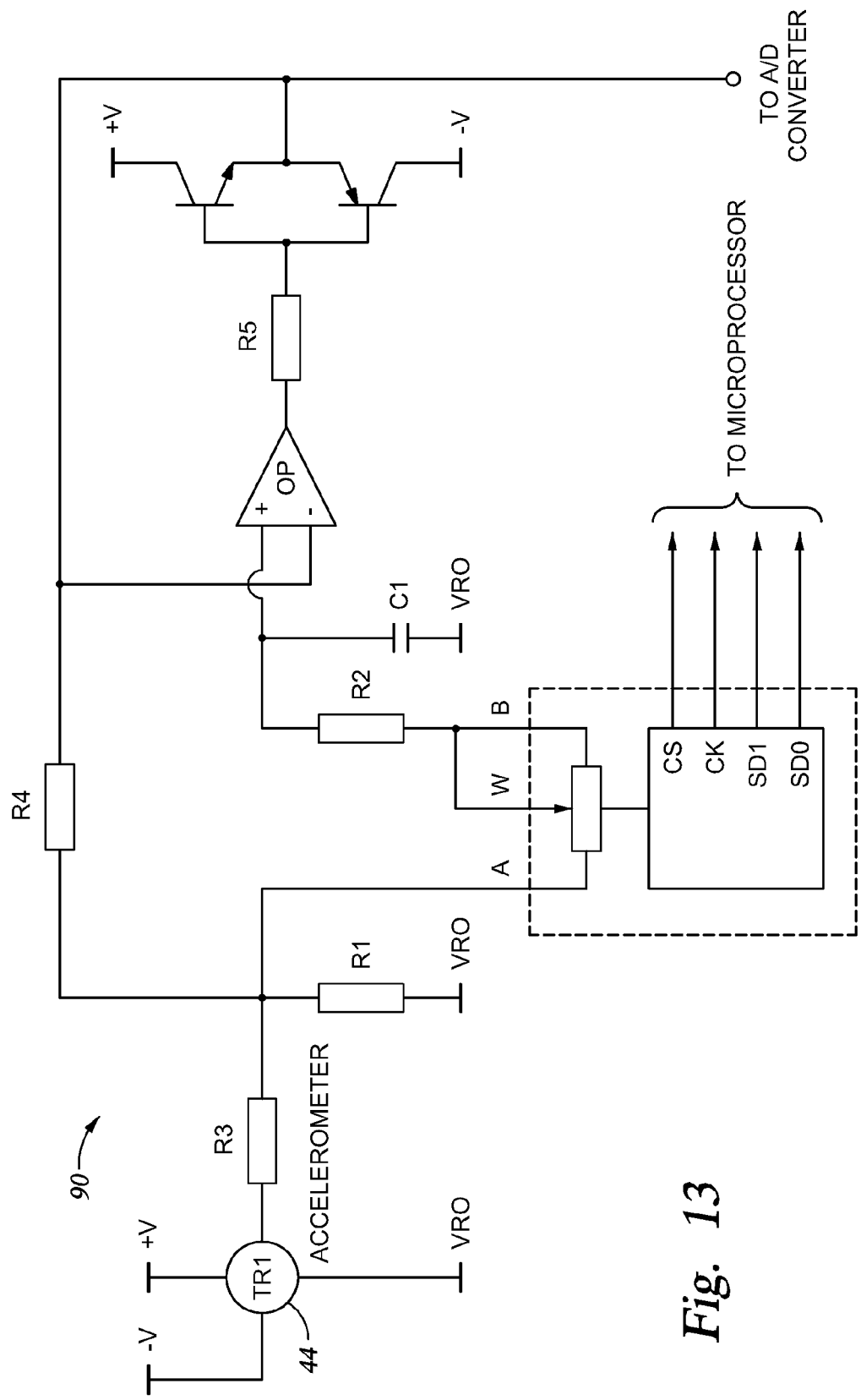
FIG. 13 is a schematic block diagram of another embodiment of a damping circuit according to the present invention.

Referring to FIG. 13 another embodiment of a damping circuit is generally identified by reference numeral 90. The circuit 90 is generally similar to the circuit 80 with like numerals indicating like parts. The circuit 90 comprises a variable circuit element that permits the effective resistance of R2 to be altered. In this embodiment the additional variable circuit element comprises a digital potentiometer 92 (any suitable commercially available digital potentiometer may be used) that allows fine or coarse adjustment of the damping frequency under microprocessor control. In particular, the digital potentiometer 92 controls the voltage drop across the resistor R2, and thereby the current flowing through it. If the current is increased, the ratio of R2/R4 drops and the effective capacitance of C1 is lowered. In this way, the cut-off frequency of the circuit can be increased. Conversely, if the current through R2 in reduced using the potentiometer 92, the ratio of R2/R4 increases and the effective capacitance of C1 is raised. In this way, the cut-off frequency of the circuit can be lowered. A microprocessor (for example in the digital processing circuit 40) may monitor the output signal for any rectification offset effects similar to that shown in FIGS. 2 and 3 and FIGS. 5 and 6. When detected, the microprocessor adjusts the potentiometer 92 to reduce or substantially eliminate the offset.

Figure 14:
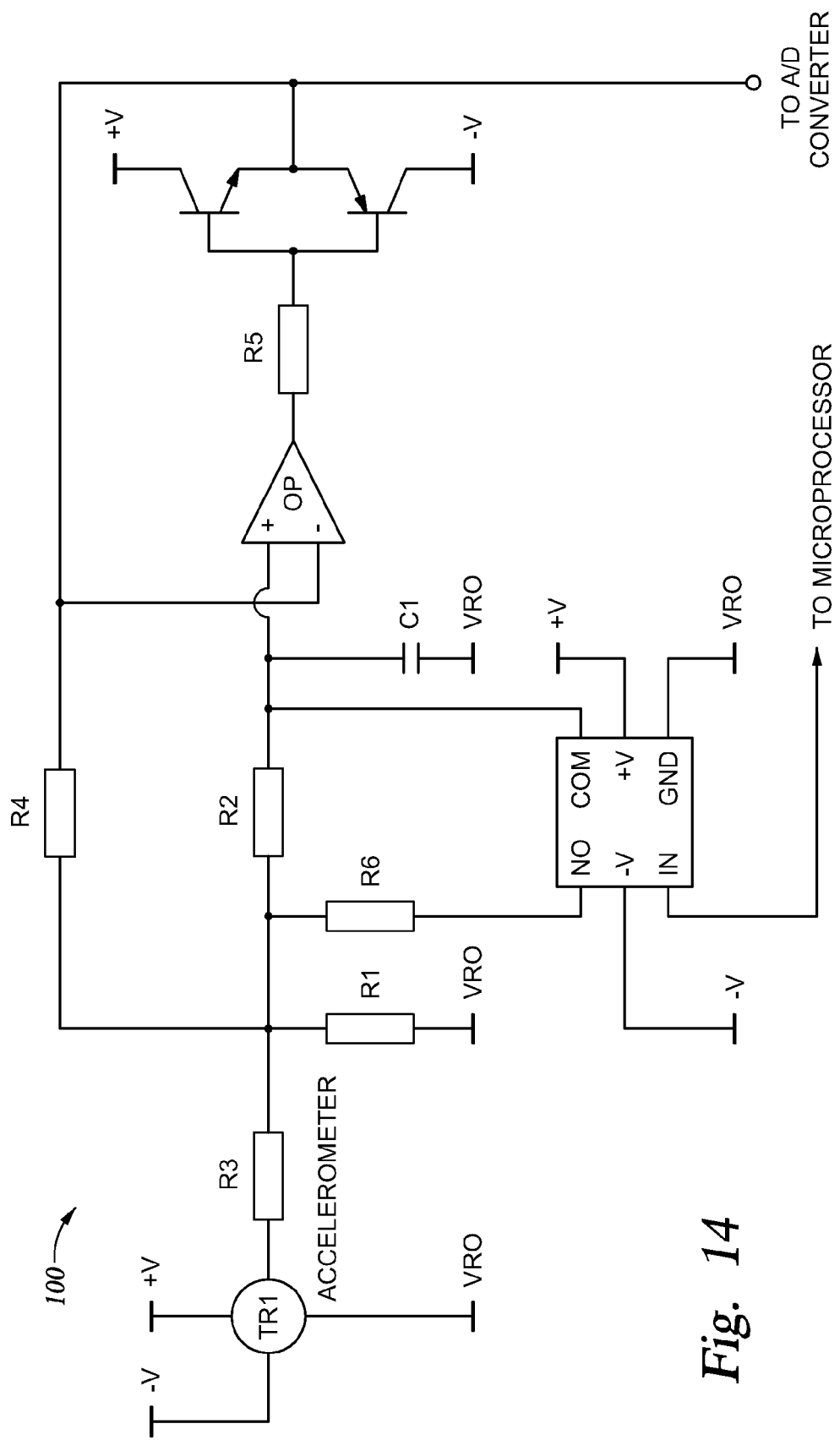
FIG. 14 is a schematic block diagram of another embodiment of a damping circuit according to the present invention.

Referring to FIG. 14 another embodiment of a damping circuit is generally identified by reference numeral 100. The circuit 100 is generally similar to the circuit 80 with like numerals indicating like parts. The circuit 100 comprises an analog switch 102 (any suitable commercially available analog switch may be used) which provides a switched connection for a resistor R6 in parallel with resistor R2. The control of the switch 102 is via port pins on a microprocessor (not shown). By switching in resistor R6 the effective resistance of R2 can be lowered, thereby lowering the ratio of R2/R4 so that the effective capacitance of C1 is lowered. In this way, the cut-off frequency of the damping circuit can be increased. By switching the resistor out of the circuit, the cut-off frequency can be lowered. In a similar way to FIG. 2, resistor R6 may be switched in and out of the circuit in response to the output at the digital processing circuit 40. Embodiments of the present invention enable improved measurement in a wellbore by a directional tool suffering drilling induced vibration of any combination of the following: gravity toolface, inclination, azimuth, position and rotation parameters.

The range of subsurface Measurement Whilst Drilling (MWD) and trajectory control applications that would benefit from one or more embodiment of the present invention include, but are not limited to, any of:

1. Steerable system magnetic (open hole) orienting and surveying.
2. Steerable system dynamic 'on the fly' orienting and surveying.
3. Steerable System directional and positional gyroscopic orienting and surveying.
4. Near bit inclination, orienting and surveying (geosteering) applications.
5. Air Drilling and Coil Tubing Underbalanced Drilling orienting and surveying applications.
6. Rotary drilling dynamic MWD inclination and surveying.
7. Rotary steerable roll stabilized platform and active gravity toolface control.

The damping circuit embodiments of the invention are useful in all manner of downhole tools used in drilling operations, including but not limited to: oil, gas and water wellbore drilling and surveying, geothermal, trenchless, and river crossing HDD applications (e.g. for pipes, cables, etc.). The invention is also useable in any kind of substantially vertical borehole drilling operation.

The damping circuit embodiments disclosed herein can be applied to any closed loop servoed design of downhole inertial sensor including rotating platform or strapdown rotation sensors utilising the servoed 'proof mass' or 'spinning mass' principle, such as gyroscopes, in which measurement of instrument precession induced torque is 'nulled' by a torquer coil current.

It will be appreciated by those skilled in the art that the techniques disclosed herein can be fully automated/autonomous via software configured with algorithms to perform the processes as described herein. Embodiments can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Embodiments of the invention may also be configured to perform the described functions downhole (via appropriate hardware/software implemented in the tool), at surface, and/or in combination.

While the present disclosure describes specific embodiments of the invention, numerous modifications and variations will become apparent to those skilled in the art after studying the disclosure, including use of equivalent functional and/or structural substitutes for elements described herein. For example, embodiments of the invention can also be implemented for operation in combination with conventional telemetry systems (e.g., mud pulse, fiber-optics, wireline systems, wired drill pipe, etc.). The disclosed techniques are not limited to any particular type of conveyance means or subsurface operation. For example, embodiments of the invention are highly suitable for operations such as LWD/MWD, logging while tripping, marine operations, etc. All such similar variations apparent to those skilled in the art are deemed to be within the scope of the invention as defined by the appended claims.

What is claimed is:

1. A tool for use in a downhole operation, comprising:
   at least one inertial sensor configured to provide inertial data signals during a downhole operation:
   wherein the inertial data signals are affected by undesired vibration;
   an electronic circuit configured to provide a damping effect against the undesired vibration effects on the inertial data signals;
   wherein the electronic circuit is configured to magnify a capacitance effect to compensate against the undesired vibration effects on the inertial data signals.

2. A tool as claimed in claim 1, wherein the electronic circuit is configured to actively source or sink current to/from ground to magnify the capacitance effect of the circuit.

3. A tool as claimed in claim 2, wherein the electronic circuit is configured to provide a variable damping effect.

4. A tool as claimed in claim 3, wherein the electronic circuit is configured to provide the damping effect when the tool is disposed downhole.

5. A tool as claimed in claim 4, wherein the electronic circuit is configured to maintain an output DC voltage substantially within a capture range despite vibration on the inertial sensor.

6. A tool as claimed in claim 5, wherein the tool comprises three mutually orthogonal inertial sensors, each sensor configured to provide inertial data signals during a downhole operation.

7. A tool as claimed in claim 6, wherein each sensor is linked to an electronic circuit configured to provide a damping effect against undesired vibration effects on the inertial data signals.

8. A tool as claimed in claim 7, wherein each electronic circuit is configured to actively source or sink current to/from ground to magnify the capacitance effect of the circuit.

9. A tool as claimed in claim 8, wherein each electronic circuit is configured to provide a variable damping effect.

10. A tool as claimed in claim 9, wherein each electronic circuit is configured to provide the damping effect when the tool is disposed downhole.

11. A tool as claimed in claim 10, wherein each electronic circuit is configured to maintain an output DC voltage substantially within a capture range despite vibration on the inertial sensor.

12. A method of operating a downhole tool, comprising:
    obtaining inertial data signals during a downhole operation using at least one inertial sensor disposed on the downhole tool, wherein the inertial data signals are affected by undesired vibration; and
    providing a damping effect against the undesired vibration effects on the inertial data signals using an electronic circuit disposed on the downhole tool, the circuit configured to magnify a capacitance effect to compensate against the undesired vibration effects on the inertial data signals.

13. The method as claimed in claim 12, further comprising configuring the electronic circuit to actively source or sink current to/from ground to magnify the capacitance effect of the circuit.

14. The method as claimed in claim 13, further comprising configuring the electronic circuit to provide a variable damping effect.

15. The method as claimed in claim 14, further comprising configuring the electronic circuit to provide the damping effect when the tool is disposed downhole.

16. The method as claimed in claim 15, further comprising configuring the electronic circuit to maintain an output DC voltage substantially within a capture range despite vibration on the inertial sensor.

17. The method as claimed in claim 12, wherein the tool comprises three mutually orthogonal inertial sensors, each sensor configured to provide inertial data signals during a downhole operation.

18. The method as claimed in claim 17, wherein each sensor is linked to an electronic circuit configured to provide a damping effect against undesired vibration effects on the inertial data signals.

19. The method as claimed in claim 18, further comprising configuring each electronic circuit to actively source or sink current to/from ground to magnify the capacitance effect of the circuit.

20. The method as claimed in claim 19, wherein each electronic circuit is configured to provide a variable damping effect.

21. The method as claimed in claim 20, wherein each electronic circuit is configured to provide the damping effect when the tool is disposed downhole.

22. The method as claimed in claim 21, wherein each electronic circuit is configured to maintain an output DC voltage substantially within a capture range despite vibration on the inertial sensor.

* * * * *